United States Patent [19]

Hartwell et al.

[11] Patent Number: 5,762,746
[45] Date of Patent: Jun. 9, 1998

[54] METHOD OF INTERNALLY INSULATING A PROPELLANT COMBUSTION CHAMBER

[75] Inventors: James A. Hartwell, Elkton, Md.; Dale E. Hutchens, Huntsville, Ala.; Kenneth E. Junior, Madison; James D. Byrd, Huntsville, both of Ala.

[73] Assignee: Thiokol Corporation, Ogden, Utah

[21] Appl. No.: 394,706

[22] Filed: Aug. 16, 1989

[51] Int. Cl.$^6$ ................................................ B32B 31/00
[52] U.S. Cl. ........................... 156/293; 60/219; 60/752; 60/909; 156/172; 252/62; 428/297; 523/138
[58] Field of Search ........................... 60/219, 752, 909; 156/242, 305, 172, 293; 523/138

[56] References Cited

U.S. PATENT DOCUMENTS

| | | | |
|---|---|---|---|
| 3,347,047 | 10/1967 | Hartz et al. | 60/253 |
| 3,421,970 | 1/1969 | Daly et al. | 428/98 |
| 3,775,213 | 11/1973 | Dunay | 156/305 X |
| 3,853,794 | 12/1974 | Reynard et al. | 528/168 |
| 3,856,712 | 12/1974 | Reynard et al. | 528/399 |
| 3,859,158 | 1/1975 | Park | 156/305 X |
| 3,883,451 | 5/1975 | Reynard et al. | 528/399 |
| 3,996,312 | 12/1976 | Kolich et al. | 528/168 |
| 4,053,456 | 10/1977 | Dieck et al. | 528/168 |
| 4,055,520 | 10/1977 | Dieck et al. | 528/168 X |
| 4,492,779 | 1/1985 | Junior et al. | 523/138 |
| 4,507,165 | 3/1985 | Herring | 156/191 |
| 4,535,095 | 8/1985 | Mueller | 521/89 |
| 4,600,732 | 7/1986 | Junior et al. | 523/138 |
| 4,652,476 | 3/1987 | Kromrey | 60/752 X |
| 4,803,019 | 2/1989 | Graham et al. | 264/3.1 |
| 4,956,397 | 9/1990 | Rogowski et al. | 523/138 |

FOREIGN PATENT DOCUMENTS 1030155   5/1966   United Kingdom.

OTHER PUBLICATIONS

Allcock et al., "Synthesis and Hydrolysis of Hexakis (imidazolyl)cyclotrip-phosphazene"; J. Am. Chem. Soc. 1981, vol. 103, pp. 2250–2256.

Allcock et al., "Organometallic Phosphazenes: Synthesis and Rearrangement of Propynyl–and Propadienylcyclotriphosphazenes"; J. Am. Chem. Soc. 1981, vol. 103 pp. 2256–2261.

Allcock et al., "Synthesis of High Polymeric Alkoxy–and Aryloxyphosphonitrites;" J. of Am. Chem. Soc., 1965(87:18), pp. 4216–4217.

Singler et al., "Synthesis and Characterizations of Polyaryloxyphosphazenes;" J. of Polymer Science, vol. 12, pp. 433–444 (1974).

Singler et al., "Polyphosphazenes: Synthesis–Properties–Applications;" Polymer Engineering & Science, vol. 15, No. 5, (May 1975).

Kirk–Othmer; "Encyclopedia of Chemical Technology", vol. 13, pp. 398–402 (1981).

Kirk–Othmer; "Encyclopedia of Chemical Technology" vol. 17, pp. 523–526, (1982).

Primary Examiner—Richard D. Lovering
Attorney, Agent, or Firm—Cushman Darby & Cushman IP Group of Pillsbury Madison & Sutro, LLP; Ronald L. Lyons, Esq.

[57] ABSTRACT

A composition consisting essentially of a polyphosphazene binder having the following repeating units:

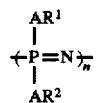

wherein n is from about 20 to about 50,000. A is selected from —O— and —NH—, and $R^1$ and $R^2$ are independently selected from alkyl having from one to about 20 carbon atoms, aryl having from 6 to about 14 carbon atoms, alkaryl having from 7 to about 30 carbon atoms, any of the preceding moieties substituted with halogen, hydroxyl, alkoxy, aryloxy, or nitro groups, or any of the preceding moieties linked by ether or amine linkages. Combined with an organic fiber filler, this material provides an erosion resistant insulation composition for temporarily protecting the interior of a rocket motor combustion chamber from thermal damage while the rocket is firing. Provided as a barrier coating or layer between the propellant grain and other structures within a rocket motor, this material prevents migration of plasticizers, nitrate esters, and other fluid or mobile ingredients from the propellant grain.

2 Claims, 1 Drawing Sheet

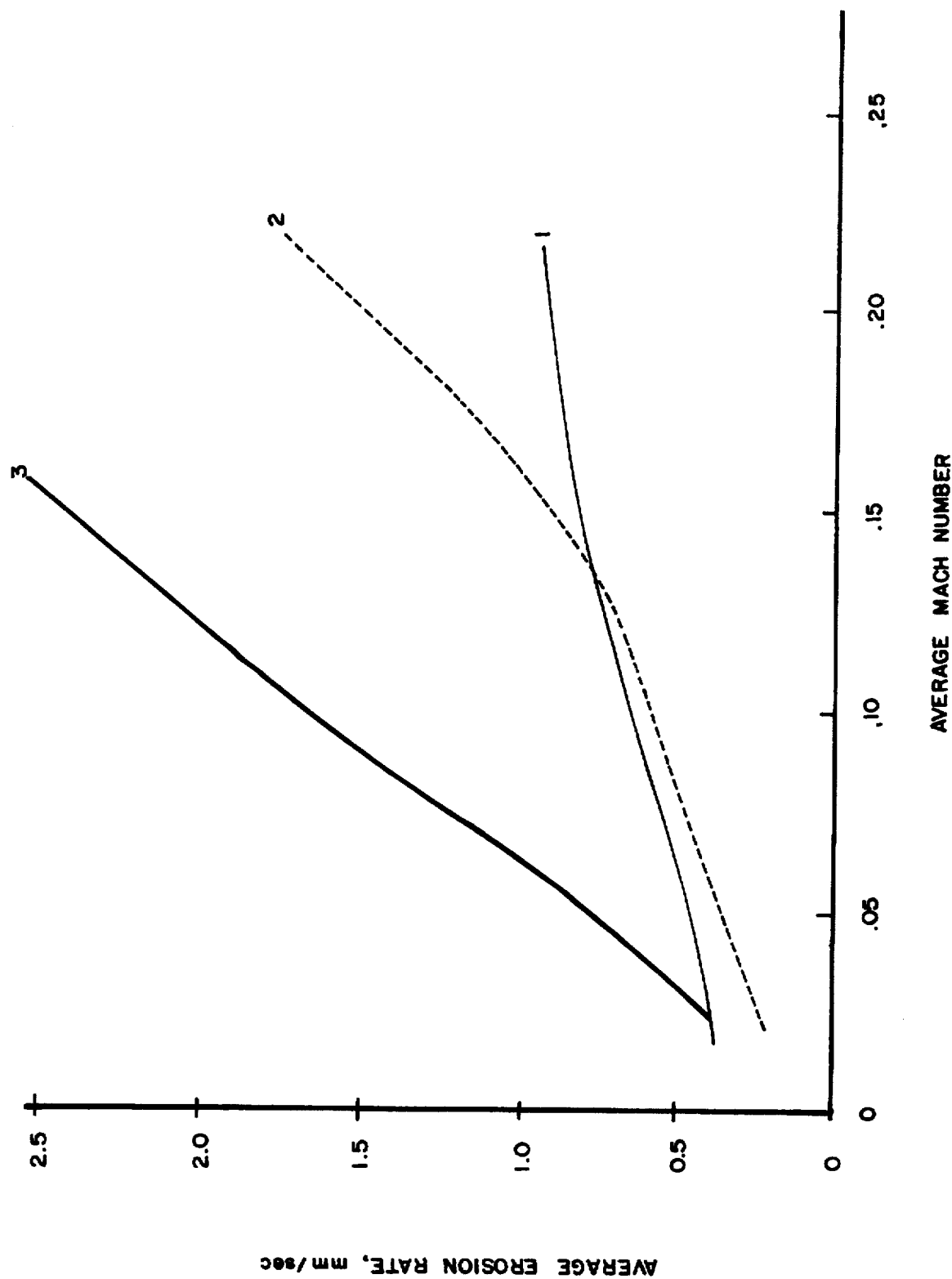

METHOD OF INTERNALLY INSULATING A PROPELLANT COMBUSTION CHAMBER

The present invention relates to elastomeric insulation for short term exposure to high temperature flames and combustion products. One particular utility of the insulation is to protect the interior of a rocket motor combustion chamber, nozzle, or tail cone during combustion.

BACKGROUND ART

The combustion of a propellant in a rocket motor creates a hostile environment characterized by extremely high temperature, pressure, and turbulence. The combustion temperature within the motor typically exceeds 5,000° F. (2760° C.). Pressure within the motor typically exceeds 1,500 psi ($1.02 \times 10^5$ g/cm$^2$). Gas velocity typically reaches or exceeds Mach 0.2 (about 154 miles per hour or 69 meters per second at 20° C.) at the aft end of the rocket motor. This environment is particularly hostile in a solid rocket motor because its combustion gas typically contains dispersed liquid droplets of aluminum oxide. These droplets are believed to produce erosion by abrading the interior of the rocket motor case. While the combustion of a rocket propellant is usually brief, the conditions described above can destroy unprotected rocket motor casings prematurely and jeopardize the mission of the motor.

Parts of a rocket which are exposed to the high temperatures, pressures, and erosive flow conditions generated by the burning propellant are usually protected by a layer of insulation. Various materials, both filled and unfilled, have been tried as insulation. These include phenolic resins, epoxy resins, high temperature melamine-formaldehyde coatings, ceramics, polyester resins and the like. These materials, when cured, usually become rigid structures which crack or blister when exposed to the rapid temperature and pressure changes occurring when the propellant is burned.

The best rocket insulation materials previously known to the art are elastomeric polymers reinforced with asbestos. These compositions are ablative insulation because the composition is partially consumed during combustion, but nevertheless provides protection for the rocket motor. Such materials are capable of enduring in a rocket motor long enough to allow complete combustion of the propellant. Asbestos-reinforced elastomeric insulation is the subject of U.S. Pat. No. 3,421,970, to Daley et al., issued Jan. 14, 1969, and U.S. Pat. No. 3,347,047, to Hartz et al., issued Oct. 17, 1967.

Environmental and health concerns have led manufacturers to seek an acceptable replacement for the asbestos in rocket motor case insulation. One alternative elastomeric insulation contains aramid polymer fibers in combination with a powder filler. That insulation is disclosed in U.S. Pat. No. 4,492,779, assigned to Morton Thiokol, Inc. A third alternative is elastomeric insulation which contains polybenzimidazole polymer fibers in combination with a powder filler. That insulation is disclosed in U.S. Pat. No. 4,600,372, assigned to Morton Thiokol, Inc. (See also U.S. Pat. No. 4,507,165.)

Polyphosphazenes are high polymers having inorganic backbones consisting of alternating nitrogen and phosphorus atoms, joined by alternating single and double bonds. Such materials have the following structure:

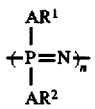

in which A is an ether or amine linkage, $R^1$ and $R^2$ (referred to collectively as "R" herein) are hydrocarbon or substituted hydrocarbon, and n is typically from about 20,000 to about 50,000. The end groups of the polymer are not specified by the manufacturer, but are believed to be either hydrogen or AR moieties. With an appropriate selection of substituents, polyphosphazene elastomers having many useful properties can be produced. U.S. Pat. No. 4,053,456, issued to Dieck, et al. on Oct. 11, 1977; U.S. Pat. No. 3,853,794, issued to Reynard, et al. on Dec. 10, 1974; U.S. Pat. No. 3,856,712, issued to Reynard, et al. on Jan. 24, 1974; U.S. Pat. No. 3,883,451, issued to Reynard, et al. on May 13, 1975; and an undated publication of Ethyl Corporation entitled *EYPEL F Polyfluoroalkoxyphosphazene - - - General Information* each indicate that certain polyphosphazenes are very flame or fire retardant. High temperature thermal stability and good low temperature properties of certain polyphosphazenes are indicated in U.S. Pat. No. 3,856,712 as cited above.

The previously cited U.S. Pat. No. 4,053,456 also indicates that such materials can be elastomeric, non-smoking when heated, and cross-linkable with peroxides or sulfur, and suggests formulation of polyphosphazenes with inorganic fillers. The previously cited EYPEL F brochure indicates that these materials bond well to metal. Other references indicating the formulation of such materials with fillers are U.S. Pat. No. 4,055,520, issued to Dieck, et al. on Oct. 25, 1977, and U.S. Pat. No. 4,535,095, issued to Mueller on Aug. 13, 1985.

The prior art also suggests certain shortcomings of polyphosphazenes in relation to their possible utility as rocket motor insulation. U.S. Pat. Nos. 3,853,794 (previously cited), column 1, lines 42–56 and U.S. Pat. No. 3,883,451, from column 1, line 60, to column 2, line 15 indicate that some polyphosphazenes are difficult to process, and their ease of processing is in some cases inversely related to their fire retardancy. Also, some of the cited references suggest an upper temperature limit or service temperature for polyphosphazenes far lower than that required for rocket motor insulation. The EYPEL F brochure, page 15, shows that the tensile strength of a polyphosphazene in which the "A" substituent of the above formula is an ether linkage and the "R" linkages of the above formula are each fluorinated alkyl drops dramatically at 200° C. Singler, et al., "Polyphosphazenes: Synthesis - Properties - Application," *Polymer Engineering and Science*, Volume 15, No. 5, pages 321–338 (1975), at page 335, column 1, second paragraph, indicates that polyphosphazenes have a service temperature of from −80° to +400° F. (−56° to +204° C.). In the same reference, page 328, Table 4, the highest melting temperature shown for a polyphosphazene is 390° C., and that polyphosphazene has a temperature of decomposition of 380° C. By comparison, the temperature of combustion products in a burning rocket motor can be 5000° F. (2760° C.).

The present inventors believe that polyphosphazenes have not previously been used as rocket motor insulation or in a comparable environment. The inventors also believe that polyphosphazenes have not been recognized to have any barrier properties preventing migration of nitrate esters and other mobile species from a propellant grain.

SUMMARY OF THE INVENTION

The present inventors have found that an insulation composition consisting essentially of a polyphosphazene binder having the substituents and other properties further identified below, combined with a reinforcing filler, and particularly an organic fiber filler, is better rocket motor insulation than other materials presently used for that purpose. Polyphosphazene-based insulation compositions are better insulators than prior art compositions containing asbestos. It is surprising that the present compositions function as rocket motor insulation because their decomposition and melting temperature are not high enough to suggest such use.

A second aspect of the present invention is a method of internally insulating a propellant combustion chamber of a solid-fueled or liquid-fueled rocket motor. "Combustion chamber" as used in this sense includes the vessel itself and the nozzle and exit cone or other structures which receive combustion gas. This method comprises the steps of selecting an insulation composition as described above, fabricating an insulating member from the composition using conventional rubber fabrication technology, and installing the insulating member as a partial or complete lining of the combustion chamber.

A third aspect of the invention is a method for reducing diffusion of a mobile ingredient of a propellant grain, such as a nitrate ester, phthalate, adipate, or sebacate plasticizer or an isocyanate curing agent, along a path in a rocket motor otherwise permitting such migration. The method is carried out by interposing a barrier layer consisting essentially of a polyphosphazene polymer across the path of diffusion of the mobile ingredient. For example, the polyphosphazene barrier layer can be a liner which is interposed and adheres between the propellant grain and the insulation of a rocket motor. The barrier layer can be applied either as a coating or as a self-supporting sheet which is adhered in place by other materials. The present insulation compositions can also act as barrier layers, keeping the insulation from absorbing mobile materials from the propellant grain. Deployment of a barrier layer prevents the depletion of plasticizers from the portion of the grain adjacent the insulator. This increases the storage life of the motor.

BRIEF DESCRIPTION OF THE DRAWING

The Figure is a plot of erosion rate vs. Mach number (velocity of combustion products in a burning rocket motor) which compares the performance of the present polyphosphazene/polybenzimidazole insulation compositions to prior compositions containing polyisoprene (vulcanized natural or synthetic rubber) as the binder and asbestos or KEVLAR polyaramid fibers as fillers.

DETAILED DESCRIPTION

The novel insulation composition of the present invention consists essentially of a polyphosphazene binder, an organic fiber filler, and preferably a powdered filler, with other optional ingredients being allowed in minor amounts which do not substantially detract from the performance of the present insulation compositions. Expressed as a two-part composition, it consists essentially of from 10 to 130 parts by weight, preferably from 25 to 75 parts by weight, of the organic fiber filler per 100 parts by weight of the polyphosphazene binder. (This proportion is expressed hereinafter as 10-130 phr of the organic fiber filler. Other proportions are similarly expressed.) If powdered fillers are also used, the composition consists essentially of from 1-100 phr, preferably from 30-65 phr of the powder filler.

The polyphosphazene binders contemplated herein are polymers consisting essentially of the following repeating units:

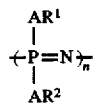

In the above formula n is from about 20 to about 50,000. A is selected from —O— and —NH—, and the terminal groups are believed to be as indicated above in the Background Art section. $R^1$ and $R^2$ are independently selected and each can be different on different parts of each molecule of the polymer. Each R can be alkyl having from 1 to about 20, preferably from 1 to about 8, and most preferably 1 to about 4 carbon atoms; aryl having from 6 to about 14, preferably 6 carbon atoms; alkaryl (which is broadly defined herein as a single moiety having both alkyl and aryl moieties in any number or order, with either an alkyl or an aryl moiety forming the point of attachment to the linkage A) having from 7 to about 30 and preferably from 7 to 9 carbon atoms; and any of the preceding moieties substituted with halogen, hydroxyl, alkoxy (defined as an alkyl group as previously defined connected to the nucleus by an ether linkage); aryloxy (defined herein as an aryl group joined to the nucleus through an ether linkage, aryl being defined as before); or nitro groups. It is also contemplated that two or more of the above groups may be linked by one or more ether or amine linkages to form another moiety within the definition of R.

Preferred $R^1$ and $R^2$ groups are selected independently from the group consisting of phenyl, mono- or polyalkylphenyl (with "poly" being defined here as indicating the presence of two or more substituents on the same nucleus, such as dialkylphenyl, trialkylphenyl, etc.), mono- or polyalkoxyphenyl, mono- or polyhalophenyl, mono- or polyhaloalkylphenyl (defined to include from 1 to 5 halo groups and/or 1 to 3 alkyl groups attached to a single phenyl group), and mono- or polyfluorinated alkyl.

Of the above list, still more preferred are polymers in which each R is polyfluorinated alkyl (in which most or all of the alkyl hydrogens are replaced by fluorine), phenyl, monochlorophenyl, monofluorophenyl, monomethylphenyl, monoethylphenyl, monomethoxyphenyl, and monoethoxyphenyl. In one most preferred polyphosphazene, each $R^1$ and $R^2$ is independently selected from phenyl and p-ethylphenyl in roughly equimolar amounts. Another most preferred polyphosphazene is one in which A is an ether linkage and each $R^1$ and $R^2$ is independently selected from 2,2,2-trifluoroethyl, preferably as about 65 mole percent of all substituents, and

wherein x is an odd integer between one and about 17, preferably between 1 and about 7, and most preferably 1, 3, or a mixture thereof, as about 35 mole percent of all substituents on the backbone.

While it is not essential that the polyphosphazenes of the present invention be vulcanized or cross-linked to serve as insulation, an example of a suitable cross-linkable material is the EYPEL F series of polyphosphazene resins available from Ethyl Corporation, Special Chemicals Division, Baton Rouge, La. Specific materials are EYPEL PZ poly(aryloxyphosphazene) elastomers shown on page 40 of the previously identified EYPEL F brochure and the FZ or poly(fluoroalkoxyphosphazene) elastomers on page 38 of the same brochure. The specifically illustrated FZ elastomers have a fluorine content of 55%, and thus the value of x in the formula is roughly 2.7. The brochure indicates that these materials also contain a small proportion of unsaturated cross-linking sites in the polymer. These cross-linking sites allow the material to be vulcanized or cross-linked as previously described.

Other suitable polyphosphazenes for use herein are described in the prior art. The generic polyphosphazene disclosures and polyphosphazene species mentioned in U.S. Pat. Nos. 3,853,794; 3,856,712; 3,883,451; 3,996,312; 4,053,456; 4,055,520; and 4,535,095; and in the following literature references: Singler, et al., "Synthesis and Characterization of Polyaryloxyphosphazenes," *Journal of Polymer Science, Polymer Chemistry Edition*, Volume 12, pages 433–444 (1974); and Singler, et al., "Polyphosphazenes: Synthesis - Properties - Applications", cited previously, are all hereby incorporated herein by reference.

Depending on the specific application, it is generally necessary to reinforce the polyphosphazenes described above with a fibrous and/or powdered reinforcing filler so the insulation will last long enough to protect the casing and other elements of the rocket motor during combustion.

For the sake of positively distinguishing between fibers and powdered fillers, a fiber filler is defined arbitrarily herein as one in which the pieces, particles, or fibrils are at least about 10 times as long as their diameters. All other fillers are considered to be powdered fillers.

Suitable organic fibers for use herein are any of the following:

polybenzimidazole,
polyaramid fiber or pulp,
polyester,
phenolic,
nylon,
cotton flock,
sisal,
other natural fibers,
polyimide,
UHMPE (ultra-high molecular weight polyethylene),
polybenzoxazole, or
mixtures thereof.

Suitable inorganic fibers for use herein are any of the following:

silica,
graphite,
alumina,
asbestos,
mineral wool,
glass,
ceramic fiber,
pitch-based (nongraphite) carbon fiber, or
mixtures thereof.

Mixtures of organic and inorganic fibers are also contemplated.

Polybenzimidazole and polyaramid fibers are preferred organic fibers. Polybenzimidazole fiber is available under the trademark "PBI" from Hoechst Celanese Corporation, Spartansburg, S.C. Polyaramid fiber is sold under the trademark KEVLAR by E. I. du Pont de Nemours & Co., Wilmington, Del. Polybenzimidazole fiber is preferred over polyaramid fiber because more polybenzimidazole fiber can be blended into the binder. Suitable pitch-based carbon fibers are sold under the trademark BARBOFLEX by Ashland Oil Inc., Russell, Ky.

Examples of powdered fillers which are useful herein are as follows:

silica
magnesium silicates,
calcium carbonate,
powdered coal
powdered NEOPRENE W
aluminum,
alumina,
aluminum hydrate,
ferric oxide,
cadmium hydroxide,
copper,
carbon,
copper-8-quinolinol,
fused magnesia,
fused zirconia,
potassium titanate,
silicon carbide,
titania,
mica,
glass,
ceramic clays,
kaolin clays,
chromic oxide,
phenolic resin particles, and
mixtures thereof.

Of the above powdered fillers, the preferred ones are finely divided silica, which has been found by others to produce less smoke when in contact with flames than other fillers, and powdered coal. Other fillers are suggested in column 4, lines 13–26 of U.S. Pat. No. 4,535,095, which is hereby incorporated herein by reference.

A wide variety of optional ingredients are contemplated for use in the present insulation compositions. Process aids, plasticizers, tackifiers, antioxidants, dispersing aids, pigments, fire retardants, lubricants, and the like can be incorporated in the present formulations. Typical ingredients are described from column 3, line 51 to column 5, line 2 of U.S. Pat. No. 4,535,095, which is hereby incorporated herein by reference.

Small amounts of more energetic binders can be blended with the polyphosphazene binders of the present invention to increase adhesion of the present insulation compositions to liners, primers, or other adjacent materials in a rocket motor. Thus, less than about 25% of a polyurethane binder, for example the isocyanate cured, hydroxy-terminated polybutadiene binders described in the art, can be incorporated in the present compositions. Preferably, however, the amount of such polymers is minimized herein to achieve the maximum potential of the present material as an insulation composition.

The polyphosphazene of the present invention is compounded with fillers and other ingredients in the same manner as the rubber insulation compositions of the prior art have been mixed. The material can be mixed in a Banbury or other high-shear mixer, or it can be milled on a two-roll mill. In either case, the curing agents and accelerators are desirably added near the end of the mixing process to minimize the amount of curing which occurs during mixing. Once the formulations have been mixed and formed into sheets or other shapes useful as insulation, the insulation can be installed in a rocket motor in a conventional manner.

As an alternative to conventional rubber processing, a copending application, U.S. Ser. No. 07/350,079, filed May 10, 1989, and now abandoned, attorney's docket number 1744-22-00, assigned to Morton Thiokol, Inc., teaches thermoplastic insulation compositions which contain no curing agents, and nonetheless function adequately as rocket motor insulation. Thermoplastic polyphosphazenes are not presently commercially available, but are contemplated for use herein.

The other aspect of the present invention is the use of a polyphosphazene barrier layer, which can either be the insulation previously described, a rocket motor liner which normally lies between either the case or insulation and the propellant grain, or other structures already within the rocket motor, as a barrier to migration of the fluid ingredients of the propellant grain within the rocket motor. For example, propellants commonly contain liquid nitrate esters, such as nitroglycerin, trimethylolethane trinitrate, butanetriol trinitrate, and others, as plasticizers and/or as energetic ingredients of composite and double-base propellants. These materials are liquids and are mobile in the propellant grain. Since the grain itself is by far the largest constituent within a rocket motor, there is little danger that the entire grain will lose most of its nitrate ester or other plasticizer. However, migration of the mobile ingredients across the interface between the grain and the liner or insulation can create local depletion of the grain at the interface, which can result in cracking, creation of gas bubbles, and other defects, thus deteriorating the bond at that interface. To prevent local depletion of nitrate esters it is useful to provide a liner composition which does not absorb or pass these plasticizers. Unfortunately a plasticizer which is mobile in the propellant grain also is commonly mobile in the liner and insulation materials, as these materials have chemistry similar to grain chemistry so they will adhere tightly to the propellant grain.

However, the present inventors have found that polyphosphazene-based compositions do not absorb plasticizers and other mobile ingredients from a propellant to any substantial degree, and do not pass such mobile ingredients. Thus, a polyphosphazene insulator or liner serves the additional function of preventing migration of mobile propellant ingredients.

If configured as insulation, a composition such as those described above will also serve as a barrier layer. If configured as a liner, the barrier composition consists essentially of a polyphosphazene resin of the type previously described, filled with from about 1% to about 40% of any of the previously described fillers and other ingredients.

One way of applying a polyphosphazene liner is to prepare a coating of the polyphosphazene polymer and any other ingredients in a suitable solvent, such as methylisobutyl ketone (MIBK), apply the liner where desired, dry the liner, and cast the propellant in contact with the liner, leaving a polyphosphazene-based coating on the grain which will reduce diffusion of mobile fluids from the propellant grain.

EXAMPLES

An erosion test was conducted to determine the relative rate of erosion of polyphosphazene insulation according to the present invention, compared to prior insulation compositions, during firing of a rocket motor. The test protocol was substantially as described in Example II of U.S. Pat. No. 4,600,732, and in FIG. 1 of that patent, which are respectively incorporated herein by reference. Table I of the present specification gives the formulations of the three insulation compositions tested. Example 1 is a polyphosphazene-based insulation according to the present invention. Example 2 is a commercial insulation formulation containing polyisoprene heavily filled with asbestos, a small amount of silica, curing agents, and other minor ingredients. Example 3 is also a prior art formulation, again having a polyisoprene or natural rubber binder, but filled with somewhat less of a polyaramid chopped fiber and a relatively larger amount of silica.

FIG. 1 plots the erosion rate vs. average Mach number for the three formulations. Erosion rate indicates the rate at which insulation composition is damaged, so a lower erosion rate indicates better insulation. Average Mach number is the velocity of gas adjacent to a particular section of insulation. The higher the Mach number, the more severe the conditions are in the rocket motor.

As FIG. 1 illustrates, Example 3, filled with a combination of polyaramid chopped fiber and silica, shows the most erosion by far, regardless of Mach number. Example 2, which is polyisoprene with a large amount of asbestos, exhibits substantially better performance, particularly at low Mach numbers, but at high Mach numbers still shows substantial erosion. By contrast, Example 1 according to the present invention exhibits about the same performance as Example 2 at low Mach numbers representing milder conditions, and performs significantly better at higher Mach numbers. In fact, the plot of Example 1 is nearly linear, with far lower slope than the other plots, indicating a composition which provides significantly better relative performance under harsher conditions. Looking at the extreme right side of FIG. 1, the erosion of Example 3 is so high that it cannot be compared. The erosion of Example 1 at a Mach number of 0.20 is about half as great with the present invention as with the reference composition, which is commercially used. The polyphosphazene compositions of the present invention are the first and only ablative rocket motor insulation compositions known to the present inventors which provide substantially better performance than an asbestos-filled polyisoprene composition. Thus, the advantages of asbestos-filled polyisoprene can be substantially exceeded without suffering the environmental hazards of asbestos.

Examples 4–14 are other formulations according to the present invention, illustrating various proportions and identities of powder fillers. Of particular note are Examples 11 and 12, which provided substantially greater erosion than some of the other formulations. Example 11 is only lightly filled with KEVLAR fiber, while Example 12 is filled with CARBOFLEX fiber. Examples 4 and 5 do not perform quite as well as Example 1, thus indicating that 50 phr of polybenzimidazole fiber is better than 20 phr or 75 phr of the same fiber.

Example 15

Several prior art and new insulation compositions were tested for absorption of various fluids (sometimes referred to herein as "diffusants") commonly found in uncured or cured propellant grains. Each insulation test material specified in the left-hand column of Table IV was cut into pieces one inch (25 mm) square and 0.1 inch (2.5 mm) thick.

Each trial was carried out by weighing a piece of test material, immersing it in the selected diffusant in a 2 ounce (60 cm$^3$) bottle at ambient temperature and reweighing the piece after three weeks and after six weeks. A weight gain represented absorption of the liuid. The data is reported in Table IV. As Table IV illustrates, the insulation materials according to the present invention, employing "FZ" or "AZ" polyphosphazene binders, generally absorbed far less of each diffusant than prior art insulation materials. Exceptions were observed when TMETN was the diffusant. The amount of TMETN taken up by the polyphosphazene compositions was more than was taken up by the polyisoprene compositions, but was not significant.

Providing a polyphosphazene is provided as a continuous layer of material, its resistance to absorption of certain liquids indicates that the liquids tested in this example also will not diffuse through the same material configured as a barrier layer. Thus, the polyphosphazene is shown by the data of Table IV to function effectively as a barrier layer, as well as a layer which will not absorb such liquids. Thus, resistance of a barrier coating of the fluorinated alkyloxy-polyphosphazine of the present invention to migration of mobile liquids in a rocket motor is demonstrated.

TABLE I

| Ingredient | Formulations (phr) | | |
|---|---|---|---|
| | 1 | 2 | 3 |
| aryloxy-polyphos-phazene | 100 | — | — |
| polyisoprene | — | 100 | 100 |
| polybenzimidazole fiber | 50 | — | — |
| polyaramid chopped fiber | — | — | 20 |
| asbestos | — | 100.0 | — |
| silica | — | 5.0 | 45 |
| other | — | 12.5 | 16.2 |

TABLE II

| Ingredient[1] | Formulations (phr) | | | | | |
|---|---|---|---|---|---|---|
| | 4 | 5 | 6 | 7 | 8 | 9 |
| aryloxy-polyphos-phazene[2] | 100 | 100 | 50 | 100 | 100 | 100 |
| fluorinated alkoxy-phosphazene[3] | — | — | 50 | — | — | — |
| polybenz-imidazole fiber[4] | 20 | 75 | 50 | 100 | 50 | 50 |
| silica powder | — | — | — | — | 30 | — |
| carbon powder | — | — | — | — | — | 30 |

[1]Each formulation also includes vendor's proprietary additives.
[2]EYPEL-A gum (Ethyl Corporation).
[3]EYPEL-F gum (Ethyl Corporation).
[4]PBI (Hoechst Celanese Corporation)

TABLE III

| Ingredient[1] | Formulations (phr) | | | | |
|---|---|---|---|---|---|
| | 10 | 11 | 12 | 13 | 14 |
| aryloxy-polyphos-phazene[2] | 100 | 100 | 100 | 100 | 25 |
| fluorinated alkoxy-phosphazene[3] | — | — | — | — | 75 |
| polybenzi-midazole | 125 | — | — | — | 50 |

TABLE III-continued

| Ingredient[1] | Formulations (phr) | | | | |
|---|---|---|---|---|---|
| | 10 | 11 | 12 | 13 | 14 |
| fiber[4] | | | | | |
| polyaramid fibers[5] | — | 20 | — | — | — |
| polyimide fiber[6] | — | — | — | — | — |
| carbon fiber[6] | — | — | 50 | — | — |

[1]Each formulation also includes vendor's proprietary additives.
[2]EYPEL-A gum (Ethyl Corporation).
[3]EYPEL-F gum (Ethyl Corporation).
[4]PBI (Hoechst Celanese Corporation)
[5]KEVLAR (E.I. du Pont de Nemours & Co.)
[6]CARBOFLEX (Ashland Oil, Inc.)

TABLE IV

Weight % Increase of Test Material After Soaking in Liquid Diffusant

| Diffusant | IPDI[1] | DOA[2] | DDI[3] | TMETN[4] | CATO-CENE[5] |
|---|---|---|---|---|---|
| Three Weeks' Soaking | | | | | |
| Test Material | | | | | |
| TI-R700 (Polyisoprene)[6] | 41.7 | 53.39 | 38.98 | 0.91 | 35.84 |
| Polyisoprene/Kevlar[7] | 37.65 | 23.66 | 32.90 | 0.87 | 34.46 |
| HTPB/DDI Gumstock[8] | 78.25 | 447.62 | 101.97 | 2.54 | 127.32 |
| FZ[9] | 30.91 | 8.14 | 1.19 | 1.70 | 0.47 |
| AZ + 50 phr PBI[10] | 24.33 | 8.75 | 3.85 | 0.74 | 10.80 |
| AZ + 100 phr PBI | 12.42 | 7.01 | 2.49 | 0.75 | 6.66 |
| Six Weeks' Soaking | | | | | |
| Test Material | | | | | |
| TI-R700 (Polyisoprene)[6] | 65.75 | 57.02 | 63.32 | 0.81 | 54.54 |
| Polyisoprene/Kevlar[7] | 47.59 | 25.30 | 47.55 | 0.84 | 44.29 |
| HTPB/DDI Gumstock[8] | 124.06 | 494.90 | 166.7 | 2.69 | 170.20 |
| FZ[9] | 46.19 | 8.75 | 2.52 | 1.93 | 0.57 |
| AZ + 50 phr PBI[10] | 39.27 | 12.07 | 8.26 | 1.12 | 11.43 |
| AZ + 100 phr PBI | 21.57 | 9.89 | 5.51 | 0.91 | 10.81 |

[1]isophorone diisocyanate
[2]dioctyl adipate
[3]proprietary diisocyanate; trademark of Henkel Corp.
[4]trimethylolethane trinitrate
[5]trademark for trimesoyl-1-(2-ethyl)-aziridine
[6]polyisoprene insulation composition with 65 phr fumed silica filler and other ingredients, as specified in Table I of U.S. Pat. No. 4,600,732, hereby incorporated herein by reference
[7]polyisoprene insulation composition of Example 3, Table I.
[8]HTPB is hydroxy-terminated polybutadiene; DI is trademark for Henkel Corp.'s proprietary diisocyanate.
[9]FZ is EYPEL F polyfluoroalkoxyphosphazene, sold by Ethyl Corporation.
[10]AZ is EYPEL A polyaryloxyphosphazene, sold by Ethyl Corporation; PBI is Hoechst Celanese Corp.'s trademark for polybenzimidazole fiber.

We claim:

1. A method of internally insulating a propellant combustion chamber, comprising the steps of:

A. preparing an insulation composition consisting essentially of a polyphosphazene binder and a reinforcing filler, wherein said polyphosphazene consists essentially of the following repeating units:

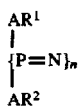

wherein n is from about 20 to about 50,000, A is selected from the group consisting of —O— and —NH—, and $R^1$ and $R^2$ are independently selected from the group consisting of alkyl having from one to about 20 carbon atoms, aryl having from 6 to about 14 carbon atoms, alkaryl having from 7 to about 30 carbon atoms, and any of the preceding moieties substituted with halogen, hydroxyl, alkoxy, arloxy, or nitro groups or linked by ether or amine linkages;

B. fabricating an insulating member from said composition; and

C. securing said insulating member to at least a portion of said combustion chamber.

2. The method of claim 1, wherein said reinforcing filler is selected from the group consisting of organic fiber fillers, inorganic fiber fillers, powdered fillers, and mixtures thereof.

* * * * *